United States Patent
Grant et al.

[11] Patent Number: 6,044,192
[45] Date of Patent: Mar. 28, 2000

[54] WAVEGUIDE PAIR WITH CLADDING

[75] Inventors: Michael Francis Grant; Stephen Day, both of Essex, United Kingdom

[73] Assignee: Nortel Networks Corporation, Montreal, Canada

[21] Appl. No.: 09/091,257

[22] PCT Filed: Jan. 8, 1997

[86] PCT No.: PCT/GB97/00040

§ 371 Date: Apr. 12, 1999

§ 102(e) Date: Apr. 12, 1999

[87] PCT Pub. No.: WO97/25636

PCT Pub. Date: Jul. 17, 1997

[30] Foreign Application Priority Data

Jan. 9, 1996 [GB] United Kingdom .................. 9600345

[51] Int. Cl.[7] .............................. G02B 6/10; C03B 37/023
[52] U.S. Cl. .............................. 385/129; 385/14; 385/42; 385/130; 385/131; 385/132; 65/385; 65/386; 65/391
[58] Field of Search .................................... 385/14, 15, 41, 385/42, 129, 130, 131, 132, 141; 65/385, 386, 391

[56] References Cited

U.S. PATENT DOCUMENTS

| | | | |
|---|---|---|---|
| 4,765,819 | 8/1988 | Kersten et al. | 385/129 X |
| 4,871,221 | 10/1989 | Imoto | 385/132 X |
| 5,467,415 | 11/1995 | Presby | 385/14 |
| 5,483,613 | 1/1996 | Bruce et al. | 385/129 |
| 5,519,803 | 5/1996 | Shiono et al. | 385/132 |
| 5,556,442 | 9/1996 | Kanamori et al. | 385/129 X |
| 5,749,132 | 5/1998 | Mahapatra et al. | 365/132 X |
| 5,841,928 | 11/1998 | Maxwell et al. | 385/129 |
| 5,841,929 | 11/1998 | Komatsu et al. | 385/129 |
| 5,904,491 | 5/1999 | Ojha et al. | 385/132 X |

FOREIGN PATENT DOCUMENTS

| | | | |
|---|---|---|---|
| 0 617 301 | 9/1994 | European Pat. Off. | 385/132 X |
| 2 292 468 | 2/1996 | United Kingdom | 385/132 X |
| WO 93/16403 | 8/1993 | WIPO | 385/132 X |

OTHER PUBLICATIONS

Holmes, "Fabrication of buried channel waveguides on silicon substrates using spin–on glass", Applied Optics, vol. 32, No. 25, Sep. 1, 1993, pp. 4916–4921.

*Primary Examiner*—Brian Healy
*Attorney, Agent, or Firm*—Lee, Mann, Smith, McWilliams, Sweeney & Ohlson

[57] ABSTRACT

A planar waveguide structure has, supported on a lower refractive index buffer layer (5), a pair of optical cores (1, 2) that, over at least a portion of their length, are closely spaced. These cores are covered with a layer (6) of cladding material comprising boron and phosphorus doped silica glass deposited by PECVD as a succession of individually annealed layers in order to minimize the incidence of voids in the deposit between the cores.

10 Claims, 1 Drawing Sheet

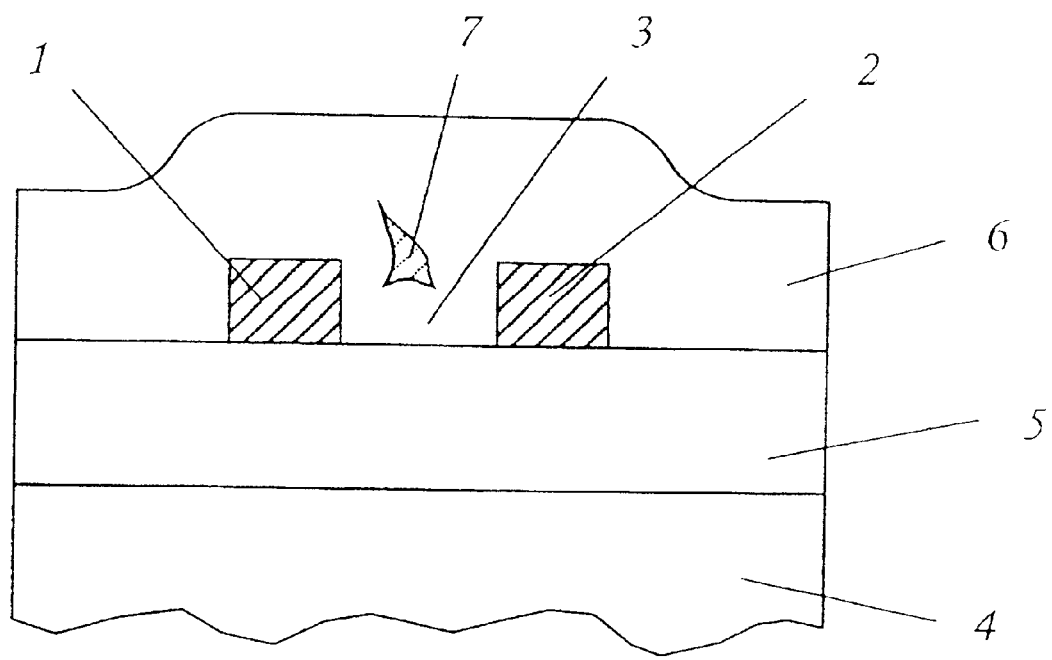

WAVEGUIDE PAIR WITH CLADDING

BACKGROUND TO THE INVENTION

The present invention relates to dielectric waveguide pairs made by plasma enhanced chemical vapour deposition (PECVD) upon planar substrates. Such deposition involves depositing and patterning material to form cores of material having a slightly greater refractive index than that of buffer layer material upon which those cores are supported and that of cladding material with which those cores are covered. Typically these waveguide pairs are designed for guiding light in the 1 to 2 μm for optical communication systems.

SUMMARY OF THE INVENTION

The invention is particularly concerned with waveguide pairs in which their waveguide cores approach close enough together to provide a significant amount of cross coupling either from the cores, or between the cores, without undue losses. Such losses can arise from irregularities or discontinuities in the intervening medium.

Embodiments of the invention aim to provide cladding for the cores produced by PECVD which maintain good and low-loss optical coupling between the two waveguide cores.

According to the invention there is provided a cladded waveguide pair assembly obtainable by plasma enhanced chemical vapour deposition (PECVD), comprising a substrate, a buffer layer of dielectric material on said substrate, a pair of elongate dielectric waveguide cores deposited on the buffer layer and of higher refractive index than that of the buffer layer, and a cladding layer of boron and phosphorus doped silica glass (BPSG) arranged over the pair of cores and adjoining regions of the buffer layer including the interval between the cores of the pair, said BPSG cladding layer having a lower refractive index than that of the material of the cores and a lower flowing temperature than that of the materials of the cores and the buffer, wherein said BPSG cladding layer is obtainable in multiple stages each stage consisting of a PECVD deposition step and a subsequent annealing step by which the deposited material is flowed.

When the buffer is pure silica, its refractive index is matched by that of a BPSG cladding, and the buffer's flowing temperature satisfactorily exceeds that of a BPSG cladding.

A feature of preferred embodiments is that the cladding is in a layer constructed in stages. It is believed that, in combination with the choice of material for the cladding, namely BPSG, the use of a multi-deposit process minimises the creation of air voids or other physical imperfections that may cause discontinuities and accordingly reduces the undesirable lossy wave coupling between the cores which otherwise tends to occur.

The use of twin dielectric cores on a buffer of silica or other material, and enveloped in dielectric cladding, is known in planar waveguide techniques.

The invention also resides in a method of producing a cladded waveguide pair assembly by plasma enhanced chemical vapour deposition (PECVD), comprising depositing a buffer layer of dielectric material on a substrate, depositing a pair of spaced dielectric waveguide cores on the buffer layer, which cores are of a material of higher refractive index than that of the buffer layer, and producing a layer of cladding over the pair of cores and adjoining region of the buffer layer including the interval between the cores of the pair, the material of said cladding layer having a lower refractive index than that of the material of the cores and a lower flowing temperature than that of the materials of the cores and buffer, wherein said cladding layer is produced in multiple stages, each stage including a PECVD deposition step followed by a step of annealing in which the deposited material is flowed.

BRIEF DESCRIPTION OF THE DRAWING

The invention will be further explained with reference to an embodiment by way of example, in conjunction with the accompanying drawing, which shows a transverse section across a dielectric waveguide pair produced by PECVD on a planar substrate illustrating schematically an undesirable fault which is largely eradicated by the use of the invention.

DETAILED DESCRIPTION OF A PREFERRED EMBODIMENT

Referring to the drawing, a dielectric waveguide pair produced by PECVD on a planar substrate seen in cross-section is assumed to extend an appreciable distance into and out of the plane of the drawing, for transmitting the optical energy longitudinally and for coupling some energy across to the intervening medium. The coupling devices may be a Y-junction, a directional coupler or a radiative star and the like, where parallel lengths of waveguide are as close as less than one micron (1 μm) to each other. The figure shows two waveguide cores 1, 2 which have been deposited on a substrate 4, suitably of silicon, with an intervening buffer layer 5. Buffer layer 5, which is preferably of silica inhibits the optical fields arising during operation from interacting with substrate 4. The cores and the buffer, at least in surrounding regions, are covered with a layer of cladding 6 which may be 20 μm or more thick, and which plays protective and optical roles.

If the heights of the waveguide cores shown schematically at 1, 2 are 5 μm it is very difficult to apply a cladding 6 to the region 3 between the waveguides. The cladding 6 in this region 3 tends to have overhangs and voids, such as that shown schematically at 7, due to significantly less material being deposited.

Overhangs and voids cause abrupt changes in refractive index, which leads to undesirable energy losses and reflections, which tend moreover to be unpredictable.

In this embodiment a process for applying cladding to closely spaced cores has been developed which reduces the tendency of these undesirable defects to form in the region 3 between the cores. According to this embodiment firstly the buffer 5 is deposited on the substrate. The next stage is to deposit core material by PECVD, and then to selectively etch the deposited core material to leave a pattern of two cores 1, 2 with an intervening volume 3 in the form of a channel of rectangular cross-section. The cores are typically 5 μm deep and about 6 μm in width with a separation channel between the cores having a width typically in the range from 1 to 8 μm. It is believed that, with two such closely spaced cores, the amount of cladding 6 material that can be deposited as a final step by PECVD in the region 3 depends upon the range of angles from which material can reach the region. Hence the occurrence of the formation of overhangs and voids, such as that shown schematically at 7, which may be 3 μm wide, may be minimised.

Such an undesirable void would prejudice the coupling action of the device, and this embodiment includes a special cladding process, as the final deposition step, incorporating boron phosphorus silica glass as the composition of the material of cladding 6. The cladding includes four stages of deposition and annealing, as follows.

Stage 1: Deposit 1.0 μm of BPSG, then flow at 1000° C. for 1 hour.

Stage 2: Deposit 3.2 μm of BPSG, then flow at 1000° C. for 1 hour.

Stage 3: Deposit 6.6 μm of BPSG, then flow at 1000° C. for 1 hour.

Stage 4: Deposit 6.6 μm of BPSG, then flow at 1000° C. for 1 hour.

The cladding composition is silica glass containing 2.4 weight % Phosphorus and 3.4 weight % Boron. The composition is suitable for the deposition, and also has a lower flowing temperature than the cores 1, 2 and has a refractive index close to that of the pure silica buffer 5. Optical performance has improved performance in comparison with previously produced cladding.

We claim:

1. A cladded waveguide pair assembly obtainable by plasma enhanced chemical vapour deposition (PECVD), comprising a substrate, a buffer layer of dielectric material on said substrate, a pair of elongate dielectric waveguide cores deposited on the buffer layer and of higher refractive index than that of the buffer layer, and a cladding layer of boron and phosphorus doped silica glass (BPSG) arranged over the pair of cores and adjoining regions of the buffer layer including the interval between the cores of the pair, said BPSG cladding layer having a lower refractive index than that of the material of the cores and a lower flowing temperature than that of the materials of the cores and the buffer, wherein said BPSG cladding layer is obtainable in multiple stages each stage consisting of a PECVD deposition step and a subsequent annealing step by which the deposited material is flowed.

2. A cladded waveguide pair assembly according to claim 1 in which the BPSG cladding layer has a refractive index close to that of the buffer.

3. A cladded waveguide pair assembly according to claim 2 in which the BPSG includes silica glass containing 2.4 weight % phosphorus and 3.4 weight % boron.

4. A cladded waveguide pair assembly according to claim 1 wherein the buffer is pure silica.

5. A cladded waveguide pair assembly according to claim 4 in which the BPSG cladding layer has a refractive index close to that of the buffer.

6. A cladded waveguide pair assembly according to claim 5 in which the BPSG includes silica glass containing 2.4 weight % phosphorus and 3.4 weight % boron.

7. A method of producing a cladded waveguide pair assembly by plasma enhanced chemical vapour deposition (PECVD), comprising depositing a buffer layer of dielectric material on a substrate (4), depositing a pair of spaced dielectric waveguide cores on the buffer layer, which cores are of a material of higher refractive index than that of the buffer layer, and producing a layer of cladding over the pair of cores and adjoining region of the buffer layer including the interval between the cores of the pair, the material of said cladding layer having a lower refractive index than that of the material of the cores and a lower flowing temperature than that of the materials of the cores and buffer, wherein said cladding layer is produced in multiple stages, each stage including a PECVD deposition step followed by a step of annealing in which the deposited material is flowed.

8. A method according to claim 7 wherein the annealing step of each deposition stage of the production of the cladding layer includes flowing at 1000° C. for one hour.

9. A method according to claim 7, wherein the deposition step of each deposition stage of the production of the cladding layer comprises PECVD deposition of BPSG silica glass consisting of 2.4 weight % phosphorus and 3.4 weight % boron.

10. A method according to claim 8, wherein the deposition step of each deposition stage of the production of the cladding layer comprises PECVD deposition of BPSG silica glass consisting of 2.4 weight % phosphorus and 3.4 weight % boron.

* * * * *